US011151368B2

(12) United States Patent
Tomihisa

(10) Patent No.: US 11,151,368 B2
(45) Date of Patent: Oct. 19, 2021

(54) IMAGE GENERATION APPARATUS, IMAGE GENERATION METHOD, AND STORAGE MEDIUM

(71) Applicant: CANON KABUSHIKI KAISHA, Tokyo (JP)

(72) Inventor: Taishi Tomihisa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 16/660,075

(22) Filed: Oct. 22, 2019

(65) Prior Publication Data
US 2020/0143158 A1 May 7, 2020

(30) Foreign Application Priority Data

Nov. 2, 2018 (JP) .............................. JP2018-207244

(51) Int. Cl.
*G06K 9/00* (2006.01)
*H04N 1/00* (2006.01)

(52) U.S. Cl.
CPC ..... *G06K 9/00456* (2013.01); *H04N 1/00331* (2013.01)

(58) Field of Classification Search
CPC combination set(s) only.
See application file for complete search history.

(56) References Cited

U.S. PATENT DOCUMENTS

| 4,879,753 | A | * | 11/1989 | El-Sherbini | ........ | H04N 1/40062 |
| | | | | | | 382/270 |
| 5,539,841 | A | * | 7/1996 | Huttenlocher | ....... | G06K 9/6211 |
| | | | | | | 382/218 |
| 8,320,019 | B2 | | 11/2012 | Namikata | | |
| 2007/0274590 | A1 | * | 11/2007 | Arai | .................... | G06K 9/00422 |
| | | | | | | 382/187 |
| 2009/0300148 | A1 | * | 12/2009 | Gomes | .................. | G06F 15/177 |
| | | | | | | 709/220 |
| 2010/0171999 | A1 | * | 7/2010 | Namikata | .......... | H04N 1/32101 |
| | | | | | | 358/530 |
| 2011/0019221 | A1 | * | 1/2011 | Fujiwara | ................ | G06K 15/02 |
| | | | | | | 358/1.14 |

(Continued)

FOREIGN PATENT DOCUMENTS

JP 2010020468 A 1/2010

*Primary Examiner* — Helen Zong
(74) *Attorney, Agent, or Firm* — Rossi, Kimms & McDowell LLP

(57) ABSTRACT

The technique of the present disclosure is capable of improving the character recognition accuracy of character recognition processing on an image to be printed. Provided is an image generation apparatus having: at least one memory that stores a program; and at least one processor that executes the program to perform: making a change for character recognition processing to at least one of a print setting for print data representing a print target image and intermediate data generated from the print data; and rendering intermediate data generated from the print data on a basis of the print setting to which the change for the character recognition processing has been made, or rendering the intermediate data to which the change for the character recognition processing has been made to thereby generate image data suitable for the character recognition processing.

15 Claims, 8 Drawing Sheets

(56) References Cited

U.S. PATENT DOCUMENTS

| | | | | |
|---|---|---|---|---|
| 2011/0167081 A1* | 7/2011 | Kosaka | ................... | G09G 5/00 |
| | | | | 707/769 |
| 2011/0286669 A1* | 11/2011 | Hagisawa | .......... | G06K 9/00449 |
| | | | | 382/182 |
| 2012/0008864 A1* | 1/2012 | Kanatsu | ............. | G06K 9/00449 |
| | | | | 382/176 |
| 2012/0120444 A1* | 5/2012 | Hirohata | .................. | G06K 9/42 |
| | | | | 358/1.15 |
| 2014/0219561 A1* | 8/2014 | Nakamura | ............. | G06K 9/344 |
| | | | | 382/176 |
| 2014/0369602 A1* | 12/2014 | Meier | .................. | G06K 9/6218 |
| | | | | 382/182 |
| 2017/0237868 A1* | 8/2017 | Sato | ................... | G06K 9/00469 |
| | | | | 358/402 |
| 2018/0373471 A1* | 12/2018 | Kawamura | .............. | G06K 9/18 |

* cited by examiner

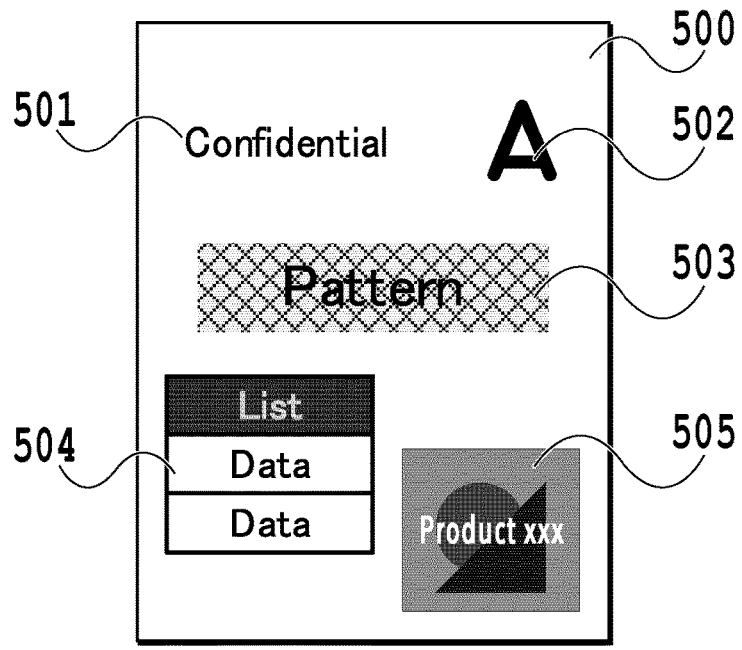
FIG.5A
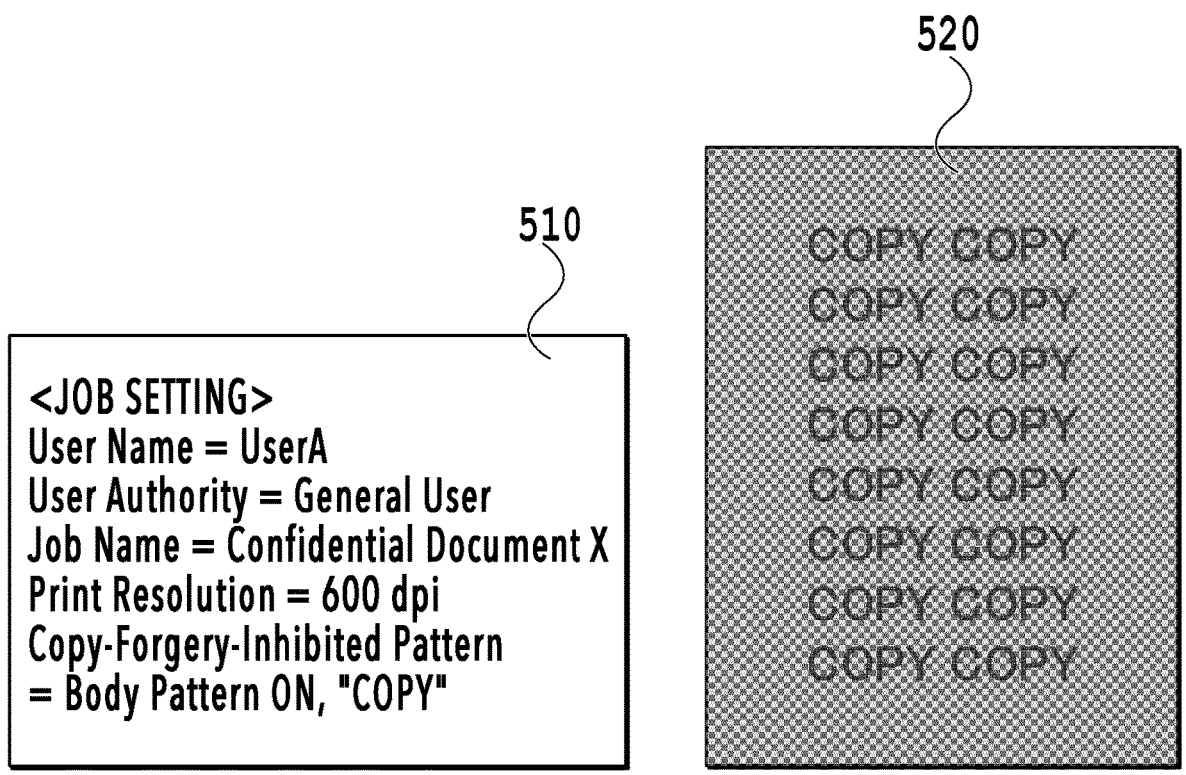
FIG.5B  FIG.5C

| | 600 | 601 | 602 | 603 |
|---|---|---|---|---|
| | Number | Keyword | Target User | Process Content |
| | 001 | Confidential | All Users | Job Cancel |
| | 002 | Design Drawing | General User | Notify |
| | 003 | Product Xxx | General User | Notify |
| | ... | ... | ... | ... |

FIG.6

IMAGE GENERATION APPARATUS, IMAGE GENERATION METHOD, AND STORAGE MEDIUM

BACKGROUND OF THE INVENTION

Field of the Invention

The technique of the present disclosure relates to a technique for generating an image suitable for character recognition processing, in particular, for optical character recognition processing.

Description of the Related Art

In recent years, how to manage printout documents has been a concern due to the increase in awareness of security of printout documents. As one technique for such management of printout documents, copy-forgery-inhibited pattern printing has been known, which utilizes the limit of the reproduction capability of scanners. The copy-forgery-inhibited pattern printing is a technique involving combining a document image and a copy-forgery-inhibited pattern image in which a character string such as "Copy Prohibited" is embedded and outputting the combined image onto an output sheet. In a case where an output product obtained by the copy-forgery-inhibited pattern printing is copied, the character string embedded in the output product, such as "Copy Prohibited", appears on the copy.

Meanwhile, there has heretofore been a technique to extract character information by performing optical character recognition processing (OCR processing) on image data obtained by rendering print data. Moreover, methods of improving the character recognition accuracy of the OCR processing in such a technique have been proposed for more accurate extraction of character information. Japanese Patent Laid-Open No. 2010-020468 describes a method of improving character recognition accuracy by changing font information of character objects in page description language (PDL) data to one that is suitable for OCR processing.

However, in a case where there are print settings for a copy-forgery-inhibited pattern image as above or the like and drawing objects such as ruled lines (i.e., non-character objects), they may possibly affect the character recognition processing on character objects. In this case, it may be impossible to ensure certain character recognition accuracy even if the font information of the character objects is changed using the method described in Japanese Patent Laid-Open No. 2010-020468.

SUMMARY OF THE INVENTION

An image generation apparatus according to the technique of the present disclosure is an image generation apparatus comprising: at least one memory that stores a program; and at least one processor that executes the program to perform: making a change for character recognition processing to at least one of a print setting for print data representing a print target image and intermediate data generated from the print data; and rendering intermediate data generated from the print data on a basis of the print setting to which the change for the character recognition processing has been made, or rendering the intermediate data to which the change for the character recognition processing has been made to thereby generate image data suitable for the character recognition processing.

Further features of the present invention will become apparent from the following description of exemplary embodiments with reference to the attached drawings.

BRIEF DESCRIPTION OF THE DRAWINGS

FIG. 5A is a diagram showing how rendering image data for character recognition processing is generated from print data;

FIG. 5B is a diagram showing how the rendering image data for character recognition processing is generated from the print data;

FIG. 5C is a diagram showing how the rendering image data for character recognition processing is generated from the print data;

FIG. 6 is a diagram showing an example of an unacceptable keyword list used in the first embodiment.

DESCRIPTION OF THE EMBODIMENTS

Figure 1:
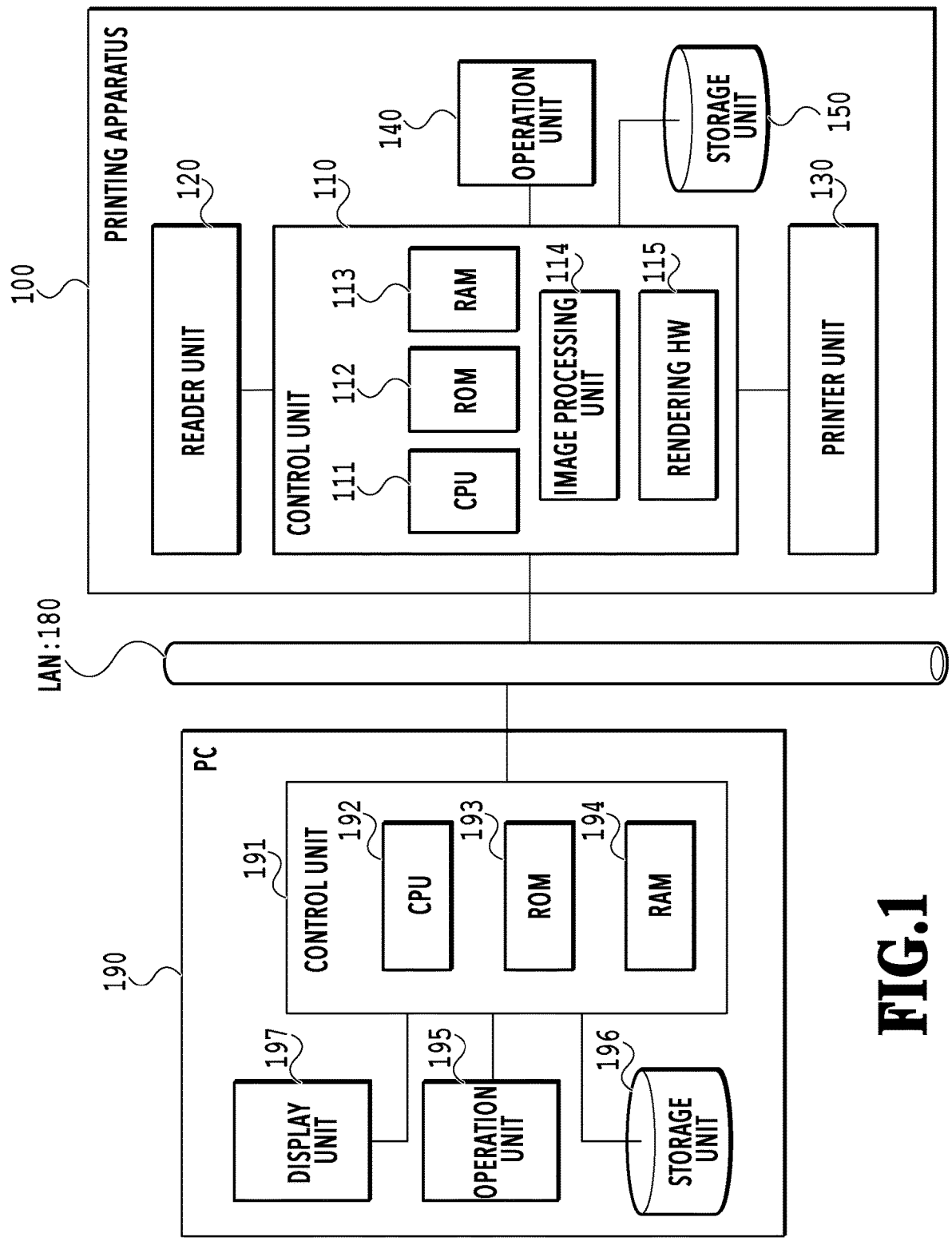
FIG. 1 is a diagram showing the configuration of a printing system in a first embodiment.

Embodiments of the technique of the present disclosure will be specifically described below with reference to the drawings. Note that the following embodiments do not limit the technique of the present disclosure according to the claims, and not all the combinations of the features described in the embodiments are necessarily essential to the solving means of the technique of the present disclosure. Meanwhile, identical constituent components will be denoted by the same reference numeral, and description thereof will be omitted.

Embodiment 1

<Overview of Printing System>

FIG. 1 is a diagram showing the configuration of a printing system in a first embodiment. As shown in FIG. 1, a printing system includes a printing apparatus 100 and a personal computer (PC) 190. In the present embodiment, a description will be exemplarily given of a case where the printing apparatus 100 is a multi function printer (MFP) in which a plurality of functions such as a printing function, a reading function, and a faxing function are integrated. However, the printing apparatus 100 may be a printer other than an MFP, such as a single function printer (SFP) or a laser beam printer (LBP). The printing apparatus 100 and the PC 190 are communicatively connected to each other through a local area network (LAN) 180. Note that the printing apparatus 100 and the PC 190 may be connected through a network other than an LAN. Also, while a single PC is exemplarily shown in FIG. 1, a plurality of PCs may be connected to the printing apparatus 100. Further, in addition to a PC(s), another apparatus such as a server may be connected to the printing apparatus 100. Furthermore, the LAN 180 may be a wired network, a wireless network, or a combination of both.

The printing apparatus 100 includes a control unit 110 (hereinafter also referred to as the image generation unit 110), a reader unit 120, a printer unit 130, an operation unit 140, and a storage unit 150. The control unit 110 is a control board (controller) that takes overall control of the printing apparatus 100. The control unit 110 includes a CPU 111, an ROM 112, an RAM 113, an image processing unit 114, and rendering hardware (rendering HW) 115. The CPU 111 controls the blocks in the control unit 110 through a system bus (not shown). As a result, functions of the printing apparatus 100 are implemented. For example, the CPU 111 controls the blocks in the control unit 110 by reading out and executing a program stored in the ROM 112, the RAM 113, the storage unit 150, or another storage medium not shown. The ROM 112 stores, for example, a control program and also tables, setting data, and so on necessary for implementing the functions of the printing apparatus 100. The RAM 113 is used as a work memory for the CPU 111, for example. The image processing unit 114 executes various types of image processing such as conversion, correction, editing, and compression/decompression on read data generated by the reader unit 120 and image data received from outside the printing apparatus 100. The image processing unit 114 may be configured with hardware or implemented with software. The rendering HW 115 is hardware that generates rendering image data at high speed from intermediate data. The storage unit 150 stores, for example, image data, apparatus information such as operation modes and licenses, an address book, and information on customization and the like. The reader unit 120 has the configuration of a scanner engine. The reader unit 120 optically reads a document set on the platen (not shown) of the printing apparatus 100 or a document fed from an automatic document feeder (ADF) to generate read data. The printer unit 130 has a printer engine supporting various printing methods such as an inkjet recording method and an electro-photographic recording method, and forms an image on a print medium. The operation unit 140 comprises operation keys that receive user operations and a liquid crystal panel that displays various setting screens, user interface (UI) screens, and so on. The operation unit 140 outputs information received from the user via the operation keys to the control unit 110. Note that the configuration of the printing apparatus 100 is not limited to the configuration shown in FIG. 1, but may include a configuration that implements other functions such as a faxing function, a configuration that enables close-range wireless communication, and so on.

The PC 190 includes a control unit 191, an operation unit 195, a storage unit 196, and a display unit 197. The control unit 191 is a control board (controller) that takes overall control of the PC 190. The control unit 191 includes a CPU 192, an ROM 193, and an RAM 194. The CPU 192 controls blocks in the control unit 191 through a system bus (not shown). For example, the CPU 192 executes functions of the PC 190 by reading out and executing a program stored in the ROM 193, the RAM 194, the storage unit 196, or another storage medium. The ROM 193 stores, for example, various control programs such as an operating system (OS) and also tables, setting data, and so on necessary for implementing the functions of the PC 190. The RAM 194 is used as a work memory for the CPU 192, for example. The storage unit 196 stores various application programs, data, user information, apparatus information, and so on. The operation unit 195 comprises a keyboard, a pointing device, and the like that receive user operations, and outputs information received from the user through them to the control unit 191. The display unit 197 is a liquid crystal display, for example, and displays various UI screens and various pieces of information.

Figure 2:
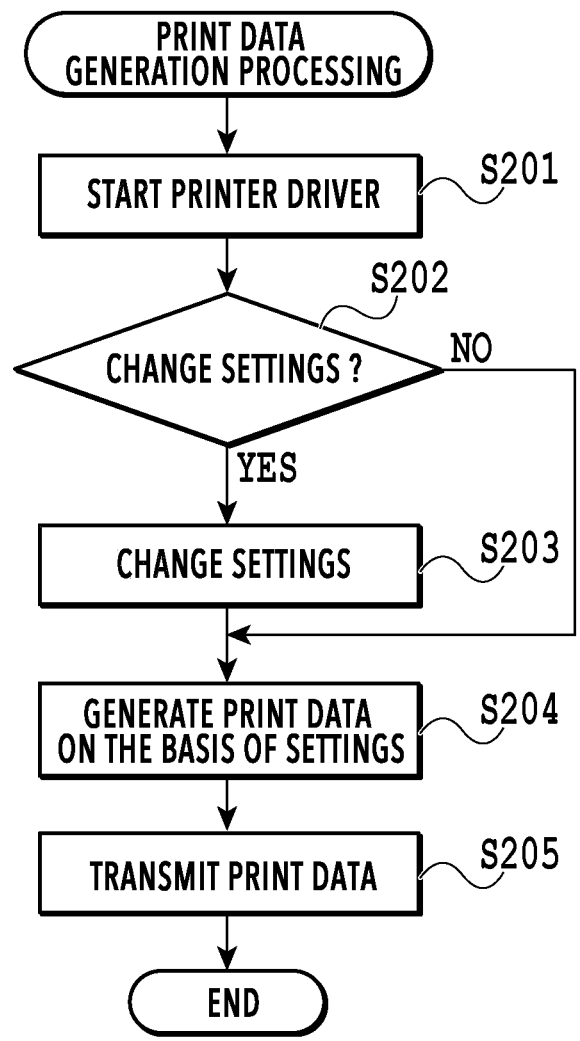
FIG. 2 is a flowchart showing print data generation processing executed by a PC.

FIG. 2 is a flowchart showing print data generation processing executed by the PC 190. The CPU 192 implements the processing shown in FIG. 2 by reading out a program stored in the ROM 193 into the RAM 194 and executing it, for example.

The CPU 192 starts a printer driver upon receipt of a print instruction from the user via a print data generation application or the like (S201). In doing so, the CPU 192 loads setting information (initial values in this example) of various settings such as print settings and image processing settings stored in the ROM 193 or the like. Then, the CPU 192 displays the printer driver's UI screen on the display unit 197. This UI screen is provided with buttons or the like for having the user select whether to change the print settings, the image processing settings, or the like or to execute printing without making a setting change. The CPU 192 checks whether the user chooses to make a setting change (S202).

If the user chooses not to make a setting change (NO in S202), the CPU 192 proceeds to a process in S204. If the user chooses to make a setting change (YES in S202), the CPU 192 displays a UI screen for changing the print settings, the image processing settings, and the like (hereinafter referred to as the setting change screen). In doing so, the CPU 192 sets the initial values of the various settings loaded in S201 on the setting change screen. Then, the CPU 192 receives operations to change various settings such as the printing settings and the image processing settings via the setting change screen (S203).

Upon receipt of a print command sent from the application through the OS, the CPU 192 generates print data according to the various settings changed in S203 (S204). Meanwhile, in the case where the process in S203 has not been executed, the CPU 192 generates print data according to the initial values of the various settings loaded in S201. Information such as user information and a job name, and information on the output method are set in the print data thus generated. Lastly, the CPU 192 transmits the print data to the printing apparatus 100 through the LAN 180 (S205) and terminates the processing.

Note that while the print data is generated using the printer driver in the PC 190 in the above example, the method of generating the print data is not limited to this method. For example, the print data may be generated using another device such as a mobile terminal, or the print data may be generated by the application without intervention of the printer driver. Also, the user information does not necessarily have to be embedded in the print data, and only needs to be associated with the print data by, for example, attaching it to the print data when the print data is transmitted.

Figure 3:
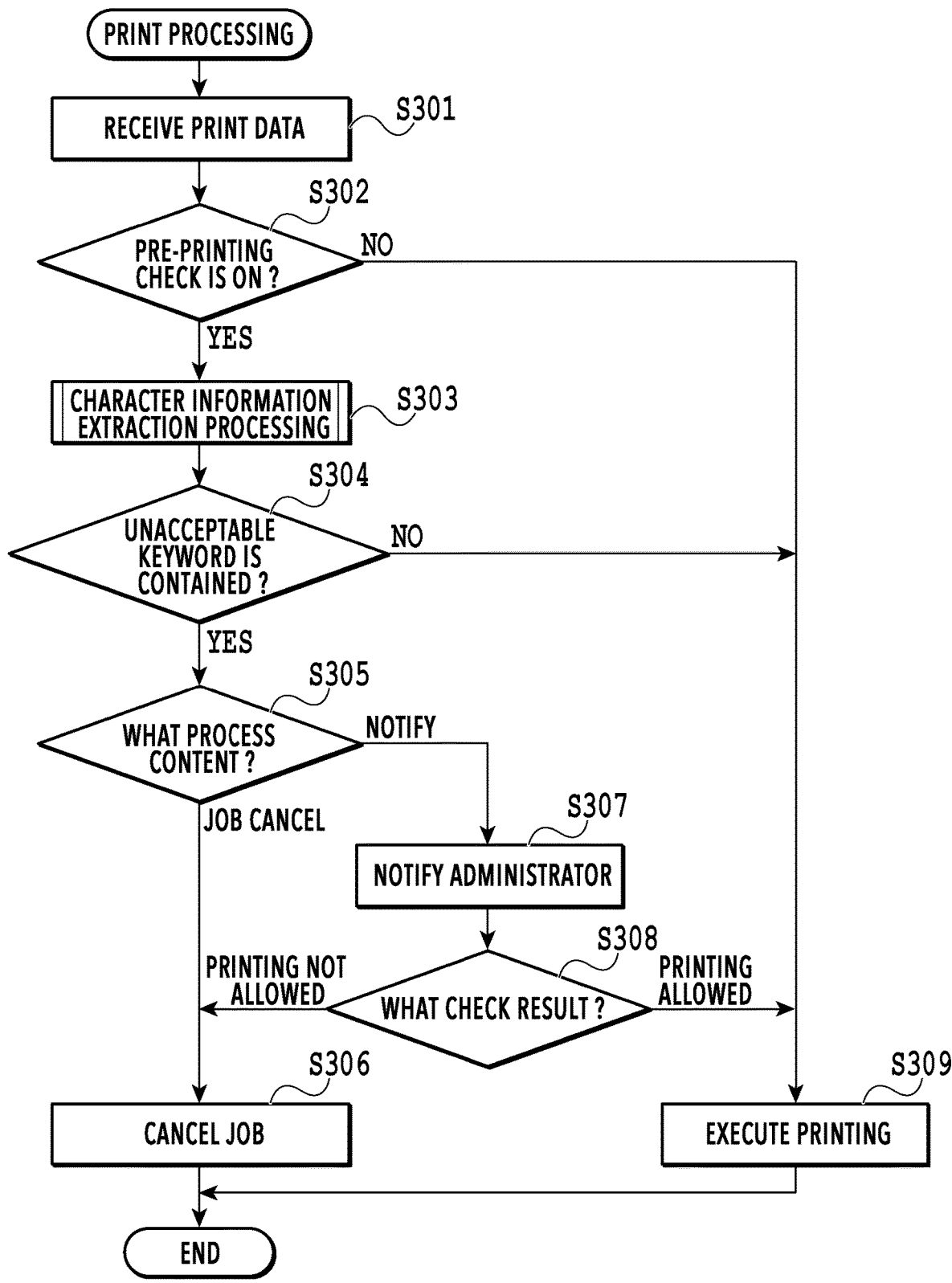
FIG. 3 is a flowchart showing print processing executed by a printing apparatus in the first embodiment.

FIG. 3 is a flowchart showing print processing executed by the printing apparatus 100 in the first embodiment. The CPU 111 implements the processing shown in FIG. 3 by reading out a program stored in the ROM 112 into the RAM 113 and executing it, for example. As the printing apparatus 100 receives the print data transmitted from the PC 190 in S205, the CPU 111 starts the processing shown in FIG. 3.

First, the CPU 111 starts a print job and allocates a job ID to the received print data (S301). Job IDs are sequentially allocated in order of reception of the corresponding jobs. Hence, the order in which the print jobs start to be processed can be uniquely identified by the corresponding job IDs. Meanwhile, to obtain the information in the print data or wait for the preceding job to be processed, for example, the CPU 111 may temporarily store the received print data in the RAM 113 or the storage unit 150 and perform the subsequent processes.

Thereafter, the CPU 111 determines whether a pre-printing check is necessary on the basis of an ON/OFF setting for a pre-printing check function, a setting for an unacceptable keyword list, user information of the print job, and so on stored in the ROM 112 (S302). The unacceptable keyword list will be described later using FIG. 6. If no pre-printing check is necessary (NO in S302), the CPU 111 proceeds to a process in S309. On the other hand, if a pre-printing check is necessary (YES in S302), the CPU 111 executes a process of extracting character information contained in the print data (hereinafter referred to as the character information extraction processing) (S303).

Figure 4:
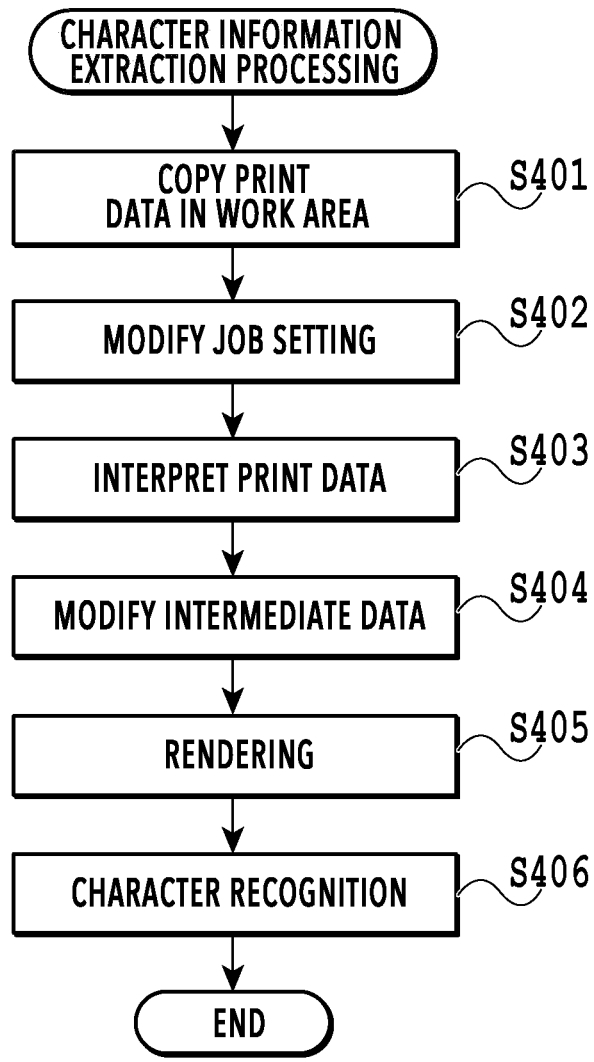
FIG. 4 is a flowchart showing the process in S303.
Figure 5D:
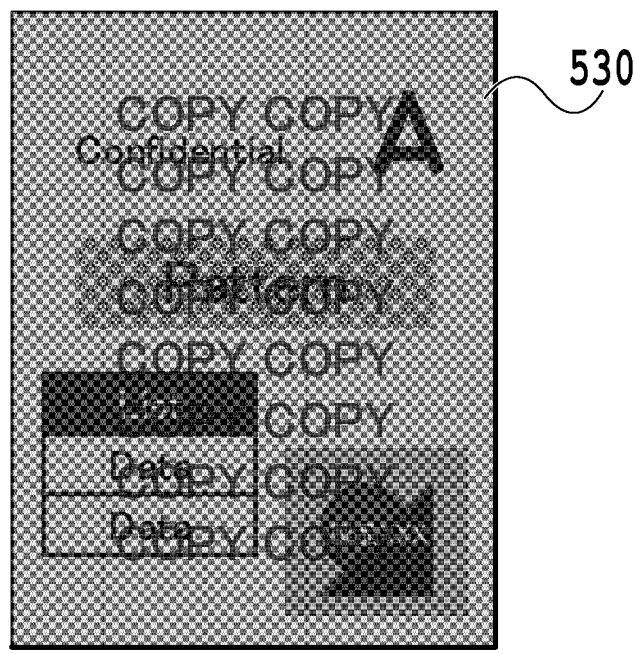
FIG. 5D is a diagram showing how the rendering image data for character recognition processing is generated from the print data.

Here, the process in S303 will be described. FIG. 4 is a flowchart showing the character information extraction processing in S303. First, the CPU 111 copies the print data in a work area in the RAM 113 or the storage unit 150 (S401). FIG. 5A shows an example of a drawing image represented by the print data (hereinafter also referred to as print target image). A drawing image 500 contains a character string 501, a graphic 502, a character string 503 drawn in a background pattern, a list 504 including ruled lines, and an image 505. FIG. 5B shows an example of a job setting in the print data. In a job setting 510, print settings such as the user name, the user authority, the job name, the print resolution, and a copy-forgery-inhibited pattern setting are designated. In this example, as shown in FIG. 5B, the copy-forgery-inhibited pattern setting includes a setting for turning on a copy-forgery-inhibited pattern printing function of the main body of the printing apparatus, and a setting for embedding characters "COPY" as a copy-forgery-inhibited pattern. FIG. 5C shows a copy-forgery-inhibited pattern image 520 generated according to the copy-forgery-inhibited pattern setting in the job setting 510. FIG. 5D shows a rendering image 530 for printing to be outputted by normal print processing. The rendering image 530 for printing is generated by combining the drawing image 500 and the copy-forgery-inhibited pattern image 520. Note that the rendering image 530 for printing is an image with the copy-forgery-inhibited pattern image adversely affecting the recognition accuracy of OCR processing (i.e., an image not suitable for character recognition processing).

Then, the CPU 111 modifies the job setting 510 of the print data so as to change the copy-forgery-inhibited pattern setting to a disabled (OFF) state for character recognition processing so that the copy-forgery-inhibited pattern image 520 will not be combined (S402). Although the copy-forgery-inhibited pattern setting is used as an example in the above, other print settings for combining images such as an overlay setting, a stamp setting, a header setting, and a footer setting are likewise changed to an OFF state. Also, the CPU 111 likewise changes setting items for the print output that have impacts on the drawing result, such as image processing settings relating to line thickness and image sharpness, to an off state or the like. In other words, the CPU 111 changes these setting items to settings that have less impacts on the drawing result. Then, the CPU 111 interprets the job setting of the print data and a PDL command and generates intermediate data for a rendering process (S403). Here, generating intermediate data that can be processed by the rendering HW 115 from the print data enables high-speed processing at the rendering HW 115.

Then, the CPU 111 modifies the intermediate data for character recognition processing (S404). In the present embodiment, the CPU 111 changes designated fills such as patterns and/or gradations to monochromatic fills. For example, the CPU 111 replaces the designated color of the background pattern of the character string 503 with a single white color. Also, the CPU 111 deletes predetermined drawing objects from the list 504 with ruled lines. In the present embodiment, the CPU 111 deletes drawing objects that are small in quantity and obviously determinable as non-character objects, such as rectangles larger than predetermined sizes and lines. For example, the CPU 111 deletes the rectangle being the background of the list title and the horizontal and vertical lines. In doing so, the CPU 111 may change the color of the characters in a case where they are white characters and will be invisible with the background rectangle deleted. Further, the CPU 111 changes parameters in PDL settings that have impacts on the drawing result, including such PDL settings as page aggregation and a pixel fill-rule, to an OFF state by modifying the intermediate data. For example, in a case where "2 in 1" is set as a page aggregation parameter, the CPU 111 modifies the intermediate data to change "2 in 1" to "1 in 1", which has a less impact on the drawing result. In other words, the CPU 111 changes parameters to ones that enhance the accuracy of character recognition on the print data. As described above, in the present embodiment, PDL setting changes are made to the intermediate data instead of the PDL data. This enables PDL settings to be changed irrespective of the PDL type.

Figure 5E:
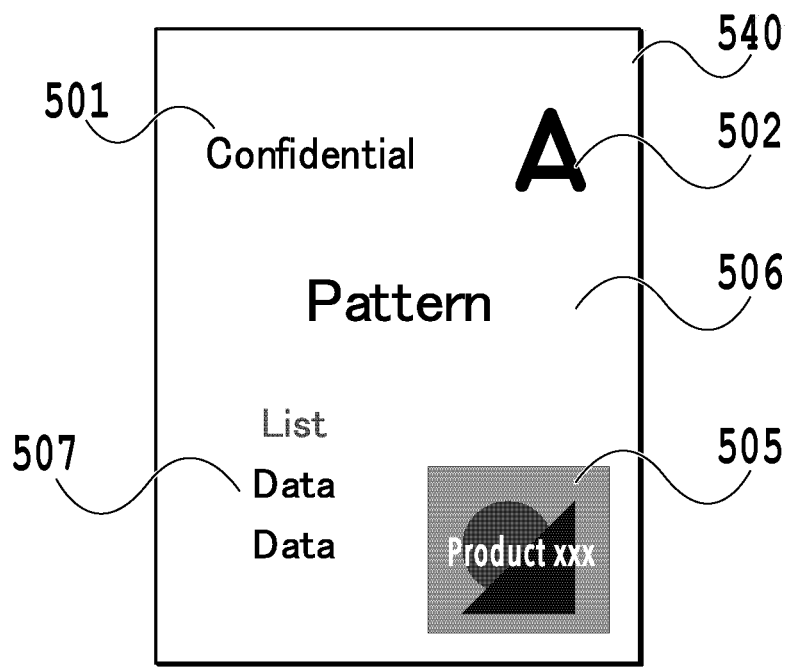
FIG. 5E is a diagram showing how the rendering image data for character recognition processing is generated from the print data.

Then, using the rendering HW 115, the CPU 111 performs a rendering process based on the intermediate data to generate rendering image data for character recognition processing (S405). Hereinafter, this rendering image data will be referred to as character recognition processing image data. Meanwhile, FIG. 5E shows a character recognition processing image 540 represented by the character recognition processing image data obtained by rendering the intermediate data modified in S404. As shown in FIG. 5E, the character string 503 in the drawing image 500 has been modified into a character string 506 as a result of deleting the background pattern. The list 504 in the drawing image 500 has been modified into a group of characters 507 as a result of deleting the ruled lines and the rectangle being the background of the title.

Lastly, the CPU 111 performs OCR processing on the character recognition processing image 540, which is generated in S405 (S406). Then, the CPU 111 stores the character information obtained by the OCR processing in the RAM 113 or the storage unit 150, and terminates this processing. The character recognition processing image 540 is an image obtained by disabling the combining of images such as the copy-forgery-inhibited pattern image and the stamps in S402 and deleting non-character drawing objects such as the background pattern, the ruled lines, and so on in S404. Using the character recognition processing image 540 in the OCR processing improves the character recognition accuracy. In this example, pieces of character information "Confidential", "A", "Pattern", "List", "Data", "Data", "Product XXX" are extracted.

The description now returns to FIG. 3. After S303, the CPU 111 compares the character information in the print data extracted in S406 and the preset unacceptable keyword list with each other to check whether the print data contains any unacceptable keyword (S304). FIG. 6 is a diagram showing an example of the unacceptable keyword list used in the first embodiment. The unacceptable keyword list contains pieces of information, namely, numbers 600, keywords 601, target users 602, and process contents 603. The numbers 600 are identification numbers uniquely allocated to the unacceptable keywords registered in the list. The keywords 601 are information indicating the contents (character strings) of the unacceptable keywords. The target users 602 are information indicating the users to be considered as the targets. The process contents 603 are information indicating the contents of processes to be executed in a case where the respective unacceptable keywords are detected in the character extraction processing in S303. Here, for the unacceptable keyword "Confidential", "All Users" are registered as the target users. Thus, whether a pre-printing check is necessary for "Confidential" can be determined only from the ON/OFF setting for the pre-printing check function, irrespective of the user information in the print job. On the other hand, for the unacceptable keyword "Product XXX", "General User" is registered as the target user. Thus, "Product XXX" does not need to be checked in S304 in a case where the user information in the print job contains information indicating that the user is other than "General User" (e.g., "administrator"). Then, to determine whether a pre-printing check is necessary for the unacceptable keyword "Product XXX", it is necessary to refer to the user information in the print job in addition to the ON/OFF setting for the pre-printing check function.

If the print data contains no unacceptable keyword (NO in S304), the CPU 111 proceeds to the process in S309. If the print data contains an unacceptable keyword (YES in S304), the CPU 111 determines the process content for the unacceptable keyword contained in the print data on the basis of the unacceptable keyword list (S305). In this example, the user authority in the job setting 510 is "General User" and the character information extracted in S406 contains the unacceptable keywords "Confidential" and "Product XXX". Thus, the CPU 111 proceeds to S305.

If the process content determined in S305 is "Job Cancel", the CPU 111 cancels the print job, performs post-processing such as deleting the temporarily stored print data, and terminates this processing (S306). On the other hand, if the process content determined in S305 is "Notify Administrator", the CPU 111 notifies the administrator's PC 190 of a request to check the content of the print data by using notification unit such as e-mail (S307). Upon receipt of this notification, the PC 190 displays a preview image of the print data or the like on the display unit 197. The administrator checks the print data on the basis of the preview image or the like displayed on the display unit 197. The administrator then operates the PC 190 to return a check result indicating whether printing is allowed or not allowed to the printing apparatus 100. In the present embodiment, in S307, the CPU 111 transmits an email message describing the URL of a web page for having the administrator enter the result of a check of the print data (hereinafter referred to as the check web page) to the PC 190 through a mail server (not shown). Upon receipt of an operation to check the email message and an operation to access the above URL from the administrator, the CPU 192 of the PC 190 displays the check web page on the display unit 197 to prompt the administrator to enter a check result. Then, as the administrator enters a check result to the check web page, the CPU 192 notifies the printing apparatus 100 (more specifically the CPU 111) of the check result. Note that the above is a mere example. How to notify the administrator and have the administrator check the print data is not limited.

If the administrator's check result indicates that printing is not allowed, the CPU 111 proceeds to a process in S306. On the other hand, if the check result indicates that printing is allowed, the CPU 111 execute printing (S309). In doing so, the CPU 111 generates intermediate data by interpreting the received print data, and renders the intermediate data by using the rendering HW 115. The CPU 111 then passes the image data obtained by the rendering to the printer unit 130. The printer unit 130 forms an image on a print medium such as a paper sheet on the basis of the received image data. The CPU 111 performs post-processing such as deleting the temporarily stored print data, and terminates the processing.

Meanwhile, in a case where a plurality of unacceptable keywords are contained like the drawing image 500 in FIG. 5A, the strictest process content among the process contents for the unacceptable keywords is selected in S305. Specifically, for the drawing image 500, "Job Cancel", which is a stricter process content than "Notify Administrator", is selected. Note that the above is a mere example. The method of selecting the process content in the case where a plurality of unacceptable keywords are contained is not limited.

As described above, in the present embodiment, a character recognition processing image is generated by changing the job setting in the print data to a setting suitable for character recognition processing, and modifying the intermediate data to a content suitable for character recognition processing. By applying processes such as setting changing and modification to information not dependent on the PDL type such as the job setting and the intermediate data as described above, it is possible to generate a character recognition processing image without having to consider the PDL type of the print data. Also, performing character recognition processing using a character recognition processing image thus generated enables accurate extraction of an unacceptable keyword even in a case where there is a setting that lowers the character recognition accuracy, such as a copy-forgery-inhibited pattern setting, in the print data. Thus, the desired process for the unacceptable keyword (job cancel or a process of notifying the administrator) is reliably performed. Therefore, in a scene where, for example, character information obtained by character recognition processing is utilized to search the print data, it is possible to properly search the print data even in a case where a copy-forgery-inhibited pattern image or the like that impairs the character recognition processing is combined with the document image. The present embodiment is useful similarly in a scene where character information obtained by character recognition processing is utilized for the checking of whether printing is allowed or not, the inspection of the print output, and the like.

Meanwhile, although an example where the entire processing shown in FIG. 3 is executed on the printing apparatus 100 has been presented in the present embodiment, part of the processing such as the character information extraction processing in S303 may be performed on a server apparatus (not shown) connected through the LAN 180 in order to distribute the processing load.

Embodiment 2

A second embodiment of the printing system according to the technique of the present disclosure will be described below. Note that the configuration of the printing system in the second embodiment is similar to that in the first embodiment and will not therefore be described. In the following, a description will be given of the part of the operation of the printing system in the second embodiment differing from that in the first embodiment.

Figure 7:
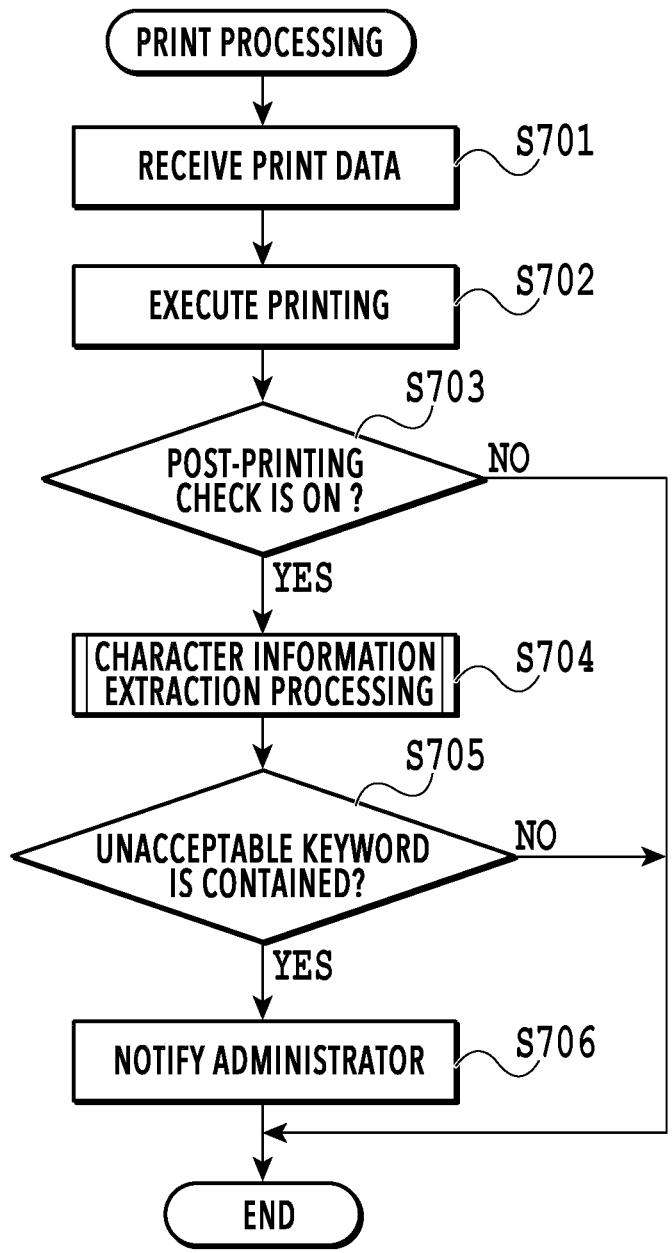
FIG. 7 is a flowchart showing print processing executed by a printing apparatus in a second embodiment.

FIG. 7 is a flowchart showing print processing executed by the printing apparatus 100 in the second embodiment.

The CPU 111 implements the processing shown in FIG. 7 by reading out a program stored in the ROM 112 into the RAM 113 and executing it, for example. As the printing apparatus 100 receives the print data transmitted from the PC 190 in S205, the CPU 111 starts the processing shown in FIG. 7. The process in S701 is similar to the process in S301.

After S701, the CPU executes printing on the basis of the received print data (S702). Note that the process in S702 is similar to the process in S309. After the print process in S702 is completed, the CPU 111 determines whether a post-printing check is necessary on the basis of an ON/OFF setting for a post-printing check function, the setting for the unacceptable keyword list, and so on stored in the ROM 112 (S703). If no post-printing check is necessary (NO in S703), the CPU 111 terminates this processing. If a post-printing check is necessary (YES in S703), the CPU 111 executes character information extraction processing (S704). In doing so, the CPU 111 executes the processes in S401 to S406 shown in FIG. 4, as in S303. Then, the CPU 111 compares the character information in the print data extracted in S406 and the preset unacceptable keyword list with each other to check whether the print data contains any unacceptable keyword (S705). If the print data contains no unacceptable keyword (NO in S705), the CPU 111 terminates this processing. If the print data contains an unacceptable keyword (YES in S705), the CPU 111 notifies the administrator's PC 190 that print data containing an unacceptable keyword has been printed by using notification unit such as e-mail (S706), and terminates this processing. Upon receipt of this notification, the PC 190 displays a preview image of the unacceptable keyword, the print data, or the like which the PC 190 is notified of on the display unit 197. The administrator checks the print data on the basis of the unacceptable keyword, the preview image, or the like displayed on the display unit 197. The administrator then takes an action such as issuing a warning to the user who printed out the print data on the basis of the check result.

As described above, in the present embodiment too, like the first embodiment, a character recognition processing image is generated and unacceptable keywords are extracted therefrom. In this manner, unacceptable keywords are extracted accurately. Also, in a case where print data containing an unacceptable keyword is printed, the administrator is notified that the print data is printed. Thus, even in a case where a print product of which browsing object persons are particular users such as a design drawing is outputted, the administrator can stop a third party from browsing that print product. In this manner, it is possible to prevent information leaks and track leakers.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to improve the character recognition accuracy of character recognition processing on an image to be printed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-207244 filed Nov. 2, 2018, which is hereby incorporated by reference wherein in its entirety.

What is claimed is:

1. An image generation apparatus comprising:
at least one memory that stores a program; and
at least one processor that executes the program to:
change for character recognition processing to a print setting for print data representing a print target image, wherein in a case where the print setting contains a first setting for combining another image with the print target image, the first setting changed to a disable state;
generate intermediate data from the print data based on the print setting in a state where the first setting is changed to the disable state; and
generate an image for the character recognition processing by rendering the generated intermediate data.

2. The image generation apparatus according to claim 1, wherein the at least one processor executes the program to obtain character information by performing the character recognition processing on the generated image.

3. The image generation apparatus according to claim 2, wherein the at least one processor executes the program to, in a case where the obtained character information contains a particular keyword, execute a notification process corresponding to the particular keyword.

4. The image generation apparatus according to claim 3, wherein the at least one processor obtains the character information and executes the notification process before printing the print target image using the print data with the print setting that includes the first setting.

5. The image generation apparatus according to claim 3, wherein the at least one processor obtains the character information and executes the notification process after printing the print target image using the print data with the print setting that includes the first setting.

6. The image generation apparatus according to claim 1, wherein the first setting is at least one of a copy-forgery-inhibited pattern setting, an overlay setting, a stamp setting, a header setting, or a footer setting.

7. The image generation apparatus according to claim 1, wherein in a case where the print setting further contains a second setting for performing predetermined image processing on the print target image, the change for the character recognition processing changes the second setting to a disable state.

8. The image generation apparatus according to claim 7, wherein the predetermined image processing includes at least one of line thickening or image sharpening.

9. The image generation apparatus according to claim 1, wherein the at least one processor executes the program to, in a case where the generated intermediate data contains a predetermined drawing object, change or delete the predetermined drawing object contained in the intermediate data, wherein the image for the character recognition processing is generated by rendering the intermediate data in a state where the predetermined drawing object is changed or deleted.

10. The image generation apparatus according to claim 9, wherein in a case where the predetermined drawing object is a drawing object containing a pattern or a gradation, the change for the character recognition processing changes a fill designated for the pattern or the gradation to a monochromatic fill.

11. The image generation apparatus according to claim 9, wherein in a case where the predetermined drawing object is a non-character object, the change for the character recognition processing deletes the predetermined drawing object.

12. The image generation apparatus according to claim 11, wherein the predetermined drawing object contains at least one of a line or a rectangle larger than a predetermined size.

13. The image generation apparatus according to claim 1, wherein in a case where the print setting further contains a page aggregation setting, the change for the character recognition processing changes the page aggregation setting to a disable state.

14. An image generation method of generating an image for character recognition processing from print data representing a print target image, the method comprising:
changing for the character recognition processing to a print setting for the print data representing a print target image, wherein in a case where the print setting contains a first setting for combining another image with the print target image, the changing for the character recognition processing changes the first setting to a disable state;
generating intermediate data from the print data based on the print setting in a state where the first setting is changed to the disable state; and
generating the image for the character recognition processing by rendering the generated intermediate data.

15. A non-transitory computer readable storage medium storing a program executable by a computer to execute an image generation method of generating an image for character recognition processing from print data representing a print target image, the method comprising:
changing for the character recognition processing to a print setting for the print data representing a print target image, wherein in a case where the print setting contains a first setting for combining another image with the print target image, the changing of the character recognition processing changes the first setting to a disable state;
generating intermediate data from the print data based on the print setting in a state where the first setting is changed to the disable state; and
generating the image for the character recognition processing by rendering the generated intermediate data.

* * * * *